United States Patent [19]
Doyle

[11] Patent Number: 6,009,219
[45] Date of Patent: Dec. 28, 1999

[54] OPTICAL BEAM SWITCHING DEVICE

[75] Inventor: Walter M. Doyle, Laguna Beach, Calif.

[73] Assignee: Axiom Analytical Incorporated, Irvine, Calif.

[21] Appl. No.: 08/835,217

[22] Filed: Apr. 7, 1997

Related U.S. Application Data

[60] Provisional application No. 60/015,328, Apr. 8, 1996.

[51] Int. Cl.$^6$ ..................................................... G02B 6/26
[52] U.S. Cl. .................................. 385/23; 385/36; 385/31; 385/18
[58] Field of Search ................................. 385/23, 20, 21, 385/22, 24, 19, 36, 31, 16–18, 15

[56] References Cited

U.S. PATENT DOCUMENTS

| | | | |
|---|---|---|---|
| 4,322,126 | 3/1982 | Minowa et al. | 385/18 |
| 4,417,824 | 11/1983 | Paterson et al. | 400/477 |
| 4,474,434 | 10/1984 | Carlsen et al. | 350/381 |
| 4,516,837 | 5/1985 | Soref et al. | 350/347 |
| 4,634,239 | 1/1987 | Buhrer | 350/486 |
| 4,674,828 | 6/1987 | Takahashi et al. | 385/18 |
| 4,740,986 | 4/1988 | Reeder | 372/92 |
| 4,809,282 | 2/1989 | Dewhirst | 372/16 |
| 5,005,934 | 4/1991 | Curtiss | 385/18 |
| 5,144,498 | 9/1992 | Vincent | 359/885 |
| 5,159,190 | 10/1992 | Hohberg et al. | 385/16 |
| 5,251,221 | 10/1993 | Stultz et al. | 372/3 |
| 5,319,477 | 6/1994 | DeJule et al. | 359/42 |
| 5,321,774 | 6/1994 | Barnard et al. | 385/16 |
| 5,361,315 | 11/1994 | Lewis et al. | 385/16 |
| 5,420,946 | 5/1995 | Tsai | 385/22 |
| 5,555,327 | 9/1996 | Laughlin | 385/16 |
| 5,642,446 | 6/1997 | Tsai | 385/16 |
| 5,647,033 | 7/1997 | Laughlin | 385/16 |

*Primary Examiner*—Rodney Bovernick
*Assistant Examiner*—Ellen E. Kang
*Attorney, Agent, or Firm*—Myers, Dawes & Andras LLP

[57] ABSTRACT

The invention is an optical switching device having a switching element which, in one aspect is a solid switching body to reduce beam spread, in a second aspect is trapezoidal in cross-section so that the optical channels selectively connected by the switching body are conveniently located on one side of the device, and in a third aspect is a retroreflective switching element that eliminates the need to achieve and maintain precise angular alignment between the switching body and the optical axes of the optical channels connected by the switching device.

12 Claims, 5 Drawing Sheets

OPTICAL BEAM SWITCHING DEVICE

This application claims the benefit of U.S. Provisional Application No. 60/015,328, filed Apr. 8, 1996.

BACKGROUND OF THE INVENTION

1. Field of the Present Invention

The present invention relates generally to optical switching devices and, more particularly, to an optical switching device for switching an optical signal in a fiberoptic transmission system between two or more possible channels while maximizing signal transmission for each path, and, if desired, for simultaneously switching two separate sets of paths such as the transmitting and receiving legs of an infrared chemical analysis system.

2. Description of the Related Art

One known optical switching device is disclosed in U.S. Pat. No. 5,005,934 entitled "Fiber Optics Channel Selection Device", issued to L. E. Curtiss on Apr. 9, 1991, and assigned to Galileo Electro-Optics Corporation. The '934 device uses two parallel mirrors to switch an optical beam between a first plurality of optical signal channels 62 and a second single signal channel 64. As shown in FIG. 1, the first plurality of channels 62 (only one is shown) include optical fibers 11 and lenses 12 for carrying signals from remote measurement locations and the second single channel 64 includes a lens 14 and an infrared detector 15. An open path 13 connects one of the first and channels 62 with the second channel 64 via first and second parallel mirrors 16, 17 that reflect the beam from the first channel 62 to the second channel 64. A stepper motor 18 rotates the mirrors 16, 17 so that the first mirror 16 is aligned with a desired one of the first signal channels 62 while the second mirror 17 remains aligned with the second signal channel 64.

The '934 device has two significant defects. First, beam spread occurs in the open path 13 between the two lenses 12, 14 and contributes to a significant loss of signal. Second the device only switches one leg of an analysis system (e.g. the receiving leg). In many systems, it is desirable to switch both the transmitted and received signals between various measurement locations.

The beam spread problem is illustrated by FIG. 2 where the open path 13 between the transmitting and receiving lenses 12, 14 is shown as a straight path for clarity. The item at the left of FIG. 2 represents the core of a fiber optic cable 11. The cables used in IR spectroscopic applications usually have quite large core diameters (e.g. 0.6 mm) due to limited signal levels and detector sensitivities encountered in this spectral region. The dashed lines in this figure represent three rays originating from a point at the edge of the core at a distance "r" from the axis of the fiber optic cable 11. Assuming the transmitting and receiving lenses 12, 14 are centered on the axis of the fiber 11, we find that the central ray makes an angle of $\alpha$ with the axis, where $\tan \alpha = r/f$. Since the end of the fiber 11 is positioned in the focal plane of the transmitting lens 12, the rays from the point on the edge will form a parallel beam 19 (neglecting optical aberration) making the same angle with the axis. By the time this beam 19 reaches the plane of the receiving lens 14, it will be displaced a distance, d, from the axis, where $d = L \tan \alpha = Lr/f$. This results in a loss of signal, with the resultant transmission being proportional to $T = D^2/(D+d)^2$.

Although devices based on the '934 patent could be used to switch both the transmitted and received legs of an optical system, this is generally not done. There are two probable reasons for this. The first is the relatively high transmission loss of the open path design, discussed above. The second is the fact that the plurality of input channels 62 and the single output channel 64 inherently lie on opposite sides of the switching device. A "double pole, multi-throw" switching device for bi-directional analysis would require either two adjacent switching devices geared together or two devices on either end of a motor shaft that is long enough so that the two sets of fiberoptic connectors forming the plurality of "first optical channels" corresponding to the two directions would be spaced apart and not interfere with each other. Even if this were done, the fiberoptic connections would be awkwardly located.

As indicated by the IR detector 15, the '934 device is usually used to switch the receiving leg of an analysis system. This is acceptable given the usual approach at the transmitting end of the system of spatially dividing the available beam between several transmitting fibers. A bundle of seven fibers, for example, may be illuminated and split into seven channels. It is often possible to do this without sacrificing much usable signal because the throughput of the spectrometer is often considerably greater than that of the optical fibers being used.

Spatial division of the transmitted signal, however, has some disadvantages. FTIR spectrometers which use an interferometer to encode the frequencies are increasingly popular. Accordingly, the portions of the beam being directed to the various fibers may pass through the spectrometer optics at different angles. As a result, they can have different frequency scales, making it difficult to transfer calibrations between different channels of the system.

There is a need, therefore, for an optical switching device which more efficiently couples two or more channels and permits the simultaneous switching of two sets of such channels.

SUMMARY OF INVENTION

In a first aspect, the present invention comprises an optical switching apparatus that uses a solid refractive switching body for selectively coupling a first optical channel to a second optical channel with improved transmission efficiency. Such an optical switching apparatus comprises a first optical channel for transmitting collimated radiation along a first axis; a second optical channel for transmitting collimated radiation along a second axis; a solid refractive switching body with first and second refractive faces; and means for moving the solid refractive switching body to respectively position the first and second refractive faces of the solid refractive switching body adjacent the first and second optical channels to selectively couple the first optical channel to the second optical channel via the solid refractive switching body. Significantly, the solid refractive switching body has a refractive index that is greater than one so that when it is located between the first optical channel and the second optical channel, radiation diverging from an off-axis point of the first optical channel at an initial angle of divergence relative to the first axis is refracted to a smaller angle of divergence upon entering the first refractive face of the solid refractive switching body and refracted back to the initial angle of divergence relative to the second axis upon exiting the second refractive face. The solid refractive switching body thereby reduces an undesirable spreading of radiation between the first and second optical channels and increases transmission efficiency.

In a second aspect, the present invention comprises an optical switching apparatus for selectively coupling a first optical channel to a second optical channel located on a same side of the apparatus. A optical switching apparatus involving this aspect of the invention comprises a first optical channel for transmitting collimated radiation along a first axis; a second optical channel for transmitting collimated radiation along a second axis that is in parallel with the first axis; a switching element with first and second reflective faces wherein the first reflective face is oriented at substantially 45 deg. relative to the first axis, the second reflective face is oriented at substantially 45 deg. relative to the second axis, and both reflective faces are oriented at 90 deg. relative to one another; and means for selectively rotating the switching element about the second axis in order to position the first reflective face adjacent the first optical channel and the second reflective face adjacent to the second optical channel to selectively couple the first optical channel to the second optical channel. The switching element could, of course, be a solid refractive switching body in accordance with the first aspect of the present invention.

In a third aspect, the present invention comprises an optical switching apparatus for selectively coupling radiation emanating from a first optical channel to a second optical channel located on a same side of the apparatus by using a retroreflective switching element. The optical switching apparatus more specifically comprises a first optical channel for transmitting collimated radiation along a first axis; a second optical channel for transmitting collimated radiation along a second axis that is parallel to the first axis; a retroreflective switching element having first, second, and third reflective faces that lie in first, second, and third planes wherein the first plane is oriented at substantially 45 deg. relative to the first axis, wherein, an intersection of the second and third planes is oriented at substantially 45 deg. relative to the second axis, and wherein all of the planes are oriented at 90 deg. relative to one another; and means for selectively rotating the retroreflective switching element about an axis of rotation that is in substantial, parallel alignment with one of the first and second axes to selectively couple the first optical channel to the second optical channel. The first, second, and third reflective faces of the retroreflective switching element beneficially form a retroreflector which keeps radiation entering the retroreflective switching element from one of the first and second optical channels in parallel alignment with radiation exiting the retroreflective switching element into the other of the first and second optical channels by automatically compensating for any angular deviation between the axis of rotation of the retroreflective switching element and the axes of the first and second optical channels.

BRIEF DESCRIPTION OF THE DRAWINGS

The just summarized invention may best be understood by reviewing the specification in view of the figures of which.

DETAILED DESCRIPTION OF THE PREFERRED EMBODIMENT

Figure 1:
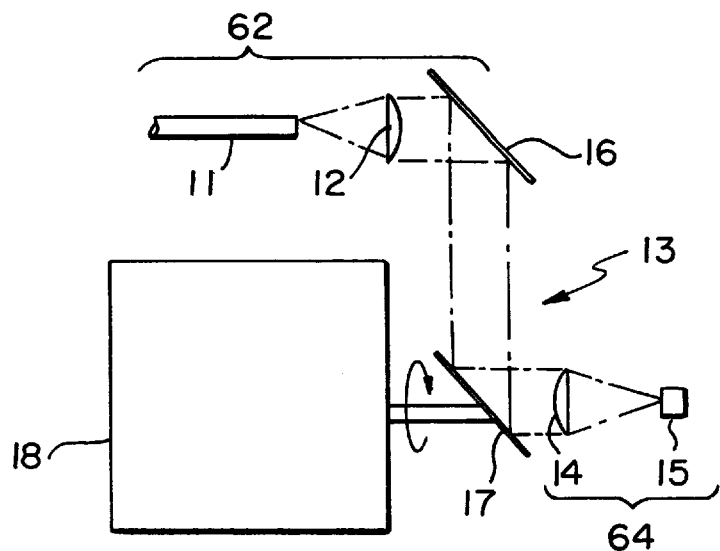
FIG. 1 is a schematic view of the open walled optical channel in the optical switching device shown in U.S. Pat. No. 5,005,934.
Figure 2:
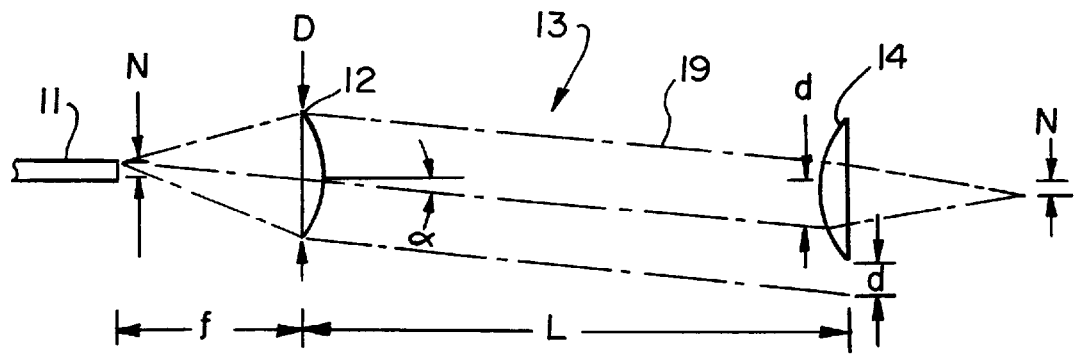
FIG. 2 is a schematic view of the light rays from a single off-axis point and the resulting misalignment that causes beam spread and corresponding loss of signal which reduces transmission efficiency in the open walled optical channel of FIG. 1.

The present invention addresses the beam spreading and cable location problems which were discussed above in connection with the '934 device. The invention has three elements. The first is the use of a solid refractive switching body 120 rather than an open optical channel 13 with parallel first surface mirrors 12,14 so as to reduce the beam spread and hence transmission loss. The second is the use of a switching element 220, which is preferably but not necessarily a solid refractive switching body 220, with an optical design which places the input and output channels 40, 50 on the same side of the switching device and makes it practical to perform "double-pole, multi-throw" switching of the transmitting and receiving legs in a bi-directional analysis system, for example, by using two switching bodies mounted on opposite ends of a motor shaft. The third element is a novel retroreflecting design for a switching element 320, which again is preferably but not necessarily a solid refractive switching body 320, which eliminates sensitivity to angular errors of the moving mechanism.

Figure 3:
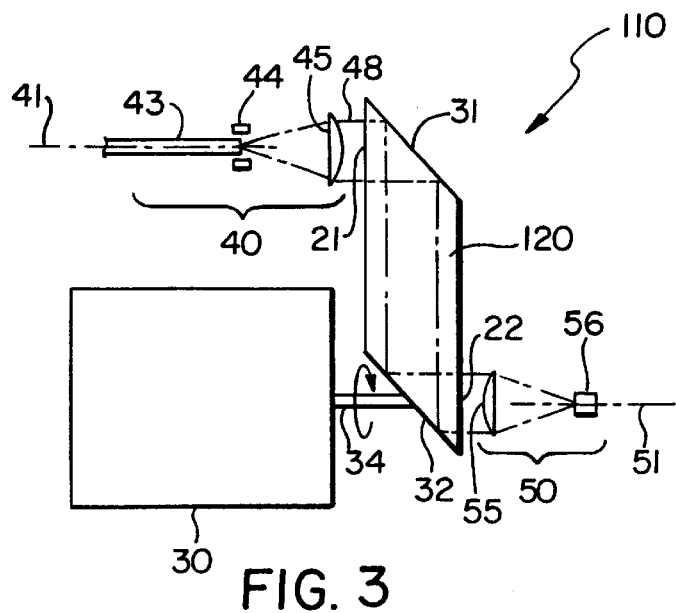
FIG. 3 is a schematic view of a first optical switching device 110 wherein the switching element 120 is a solid refractive switching body 120 according to a first aspect of the present invention.

FIG. 3 illustrates a first optical switching device 110 which employs a solid refractive switching body 120 as noted in the previous paragraph. Here, a plurality of first signal channels 40 are selectively coupled to a single second signal channel 50 via the switching body 120. The switching body 120 is rotated upon a shaft 34 of a stepper motor 30 or other suitable moving mechanism. The first signal channels 40 preferably comprise a collimating lens 45 and an optical connector 44 such as a standard SMA connector. A fiber optic cable 43 is inserted in the optical connector 44 in alignment with an optical axis 41 of the first signal channel 40. The second signal channel 50 is shown as comprising a focusing lens 55 and an IR detector 56 having an optical axis 51 that is aligned with the shaft 34 of the motor 30. The second signal channel 50, of course, could comprise an optical connector for coupling with a remote device via a fiber optic cable.

The embodiment of FIG. 3 is similar to the '934 device except for the replacement of the open path 13 and the spaced parallel mirrors 16, 17 by the solid refractive switching body 120 which is a solid parallelogram of a high index material such as Zinc Sulfide (ZnS). Of course, the high refractive index makes it important to antireflection coat the surfaces or refractive faces 21, 22 through which the light beam 48 enters and exits the parallelogram 120. The light beam 48 is totally reflected twice within the switching body 120—at the two tilted ends or reflective faces 31, 32. The reflections are total because the angle of incidence (45 degrees) is greater than the critical angle. The improvement brought about by solid refractive switching body 120 of the first device 110 can be understood by reference to FIG. 4.

Figure 4:
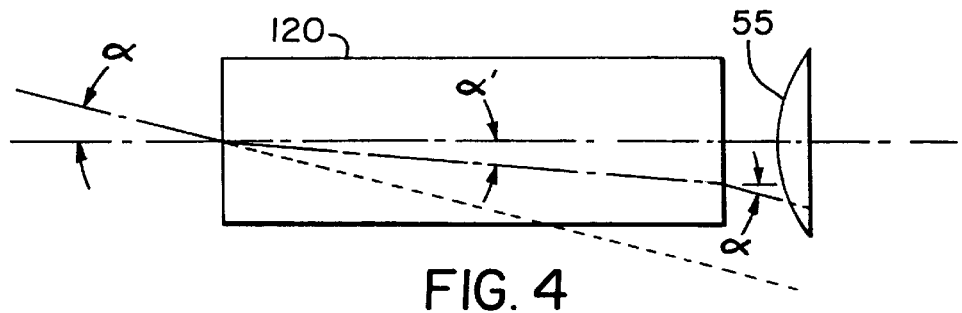
FIG. 4 is a schematic view which shows how the solid refractive switching body 120 of FIG. 3 reduces beam spread and efficiently couples the first optical channel 40 to the second optical channel 50 by reducing the angle of divergence $\alpha$ to a smaller angle of divergence $\alpha'$ within the switching body 120.

The left side of FIG. 4 shows a ray which makes an angle α with the system optical axis entering a solid refractive optical body 120. On entering the body 120, the ray is refracted and the divergence angle is reduced according to Snell's law, i.e.: $\sin \alpha' = (\sin \alpha)/n$, where "n" is the refractive index of the solid refractive switching body 120. Thus, provided that most of the distance between the transmitting and receiving lenses 45, 55 is taken up with the refractive material of the switching body 120 (as in FIG. 3), the increase in beam diameter will be reduced roughly in proportion to 1/n. For a high refractive index material such as zinc sulfide (n=2.3), the preferred material, the improvement in transmission can be considerable.

Figure 5:
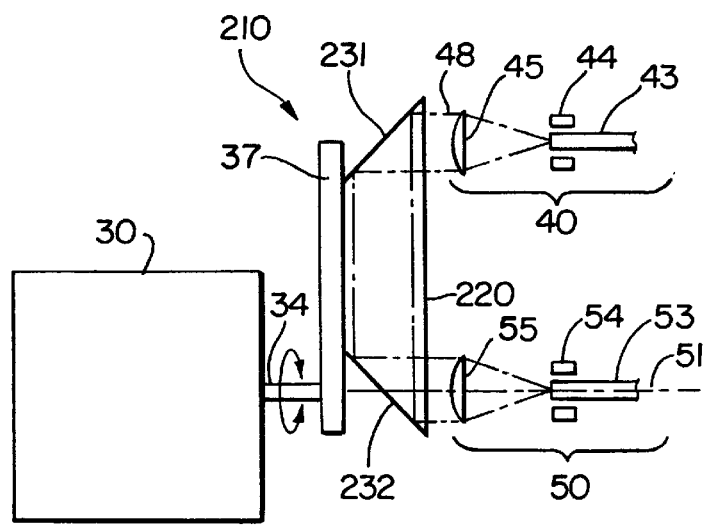
FIG. 5 is a schematic view of a second optical switching device 210 which uses a second switching element according to a second aspect of the present invention where the switching element 220 is trapezoidal so that the input and output channels 40, 50 conveniently lie in the same plane 60 on one side of the device.

FIG. 5 illustrates a second optical switching device 210 employing a switching element 220 that is designed to provide same-side switching. The preferred switching element 220 is a solid refractive body 220, as shown, but it could comprise an open optical path and suitably arranged mirrors. Here, the parallelepiped 120 of FIG. 3 has been replaced by a solid refractive switching element 220 that is generally trapezoidal in cross-section. The preferred switching element 220 is solid refractive switching body 220 that is trapezoidal in cross-section. It is carried by a base plate 37 that is rotated by the stepper motor 30 via shaft 34. Here, moreover, the IR detector 56 of the second channel 50 has been replaced by an optical connector 54 for receiving a fiber optic cable 53. The trapezoidal switching body 220 has the beneficial characteristic of switching the light beam 48 to a path which is parallel to the incident path but oppositely directed. This makes it possible to place both the input and output channels 40, 50 in the same plane 60 on one side of the switching device 210. Two such switching bodies 220 can be mounted on opposite ends of a motor shaft to provide double-pole switching with convenient placement of the fiber-optic connectors as shown, for example, in FIGS. 10, 11 and 12.

The trapezoidal switching body 220 of FIG. 5 is a significant advancement over the prior art, but it is sensitive to angular displacement of the shaft 34 relative to the optical axis 51 because it is not a perfect retroreflector. It can easily be seen that limited rotation of the body 220 about an axis perpendicular to the plane of the illustration will have no effect on the direction of the reflected beam because the tilted ends or reflective faces 231, 232 are normal to one another, and form a partial or two dimensional retroreflector.

However, rotation around an axis in the plane of the figure and perpendicular to the motor shaft will undesirably deflect the reflected beam from the optical axis 51 of the output channel 50. This is undesirable in that it requires the motor shaft 34 to be parallel to the optical axis 51 of the output channel 50 to a high degree of accuracy.

Figure 6A:
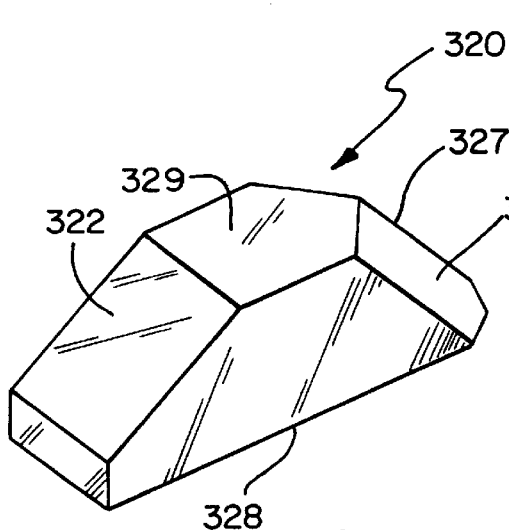
FIG. 6A is a perspective view of a preferred switching element 320 formed, here, as a solid refractive switching body 320.
Figure 6B:
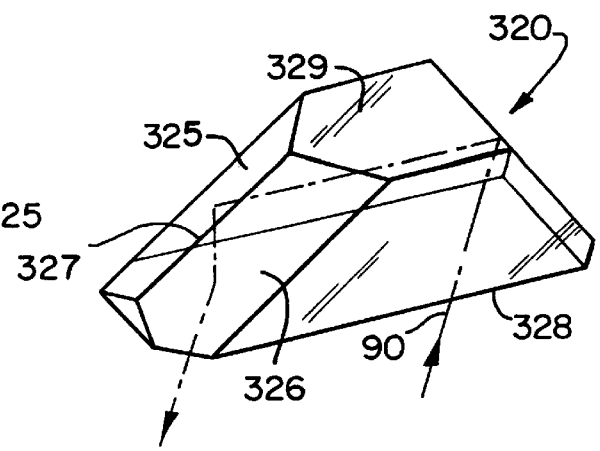
FIG. 6B is a perspective view of the preferred solid refractive switching body 320 of FIG. 6A viewed from an opposite second side thereof and showing the retroreflective path of a light beam 90 passing therethrough.
Figure 7:
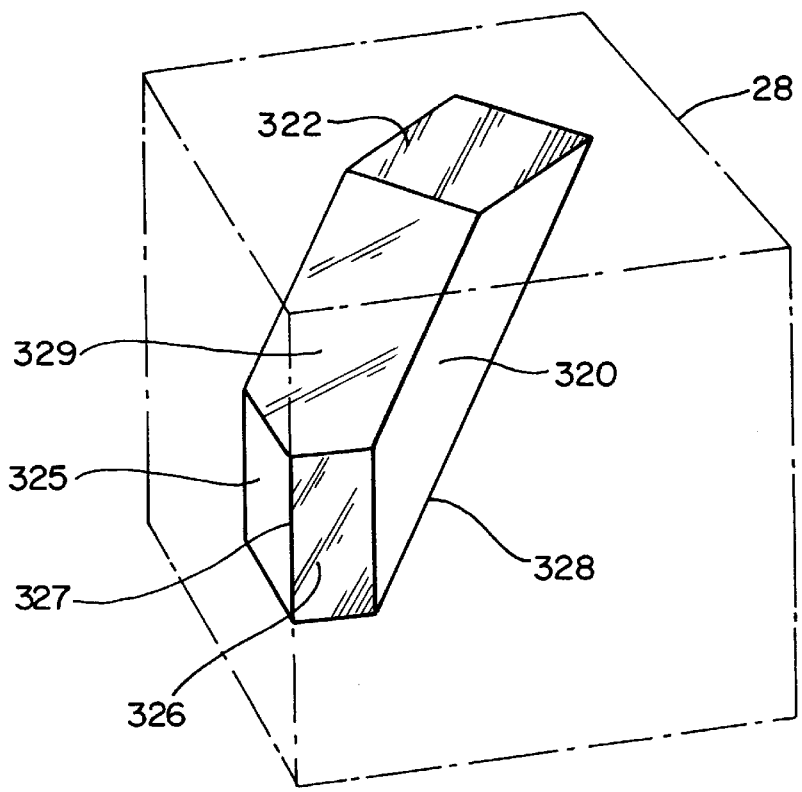
FIG. 7 is a perspective view showing that the preferred solid refractive switching body 320 comprises a geometrical section of a cube corner.
Figure 8D:
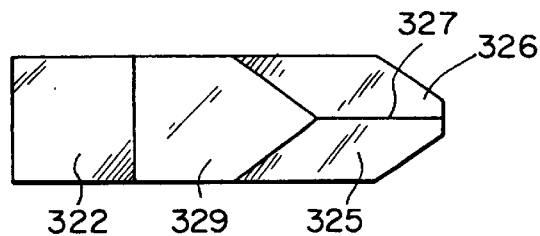
FIGS. 8A, B, C, D and E are a side elevational view, a first end view, a second view, a top elevational view, and a bottom elevational view, respectively, of the preferred solid refractive switching body 320 of FIG. 6A.
Figure 8B:
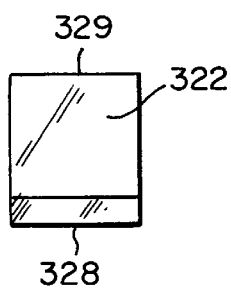
Figure 8A:
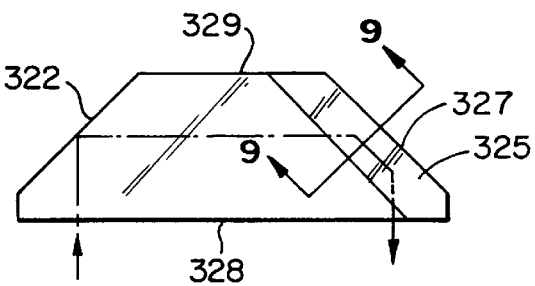
Figure 8C:
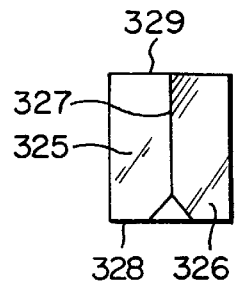
Figure 8E:
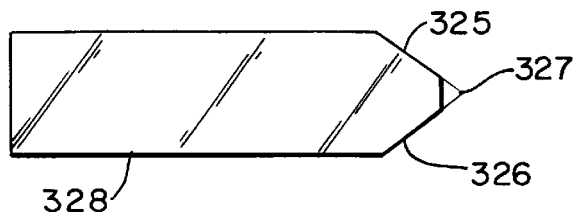
Figure 9:
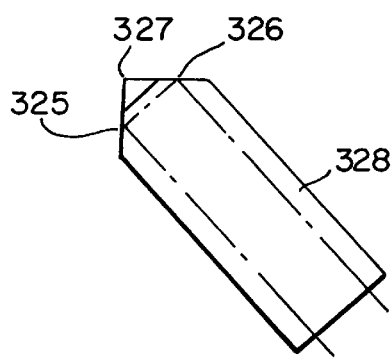
FIG. 9 is a cross-sectional view taken along section lines 9—9 of FIG. 8A showing that the two surfaces 325, 326 forming a "V" are at 90 degrees to each other.

The noted problem of angular sensitivity can be solved by replacing the trapezoidal switching body 220 with a perfect, three dimensional retroreflector. A conventional retroreflector such as cube corner, however, would be quite large. This would introduce the problems of excess size, cost, optical pathlength, and mass. A better solution is a solid refractive body which forms a perfect retroreflecting element, but has a minimum possible volume and pathlength. Again, a retroreflective switching element 320 could be accomplished with mirrors coupled to one another via an open optical path. Because of beam spreading issues discussed above, however, the preferred retroreflective switching element 320 is a solid refractive body 320 as illustrated in FIG. 6. The retroreflective body 320 can be thought of as a modification of the trapezoidal body 220 of FIG. 5 where one of the flat reflecting surfaces 231, 232 is replaced by a pair of surfaces 325, 326 forming a "V". The apex or edge 327 of the "V" makes the same angle with the front surface 328 of the element as the opposing flat single reflecting surface 322 (i.e. 45 deg.). The two surfaces 325, 326 of the "V" are at 90 degrees to each other, as illustrated by FIG. 9 which is a cross section of FIG. 8A, taken along section lines 9—9 and perpendicular to line A—A. It can be seen that the intersection 327 of the two surfaces 325, 326 is at a right angle to the opposing reflecting surface 322. Hence all three of the reflecting surfaces 322, 325, 326 are at right angles to each other. The retroreflective body 320 can thus be viewed as a particular section cut from a large cube corner 28, as shown in FIG. 7.

The following approach was taken to determine the optimum cube corner section to use for the retroreflective body 320. It was first assumed that an incident light ray will enter the body 320 normal to the front surface 328. It was then determined that the front surface 328 of the body 320 should make an angle of 45 degrees with one of the reflecting surfaces (e.g. the first reflecting surface 322) so that the light ray entering normal to the front surface 328 will strike that surface and be reflected in a direction parallel to the front surface 328, thus minimizing the required depth of the body 320. The ray would then travel across the body 320 where it will strike, in turn, each of the other two surfaces 325, 326 to emerge on a path parallel to its direction of incidence. The path of a typical ray is illustrated by the dashed lines in FIG. 6B and the various views of FIG. 8.

Figure 10:
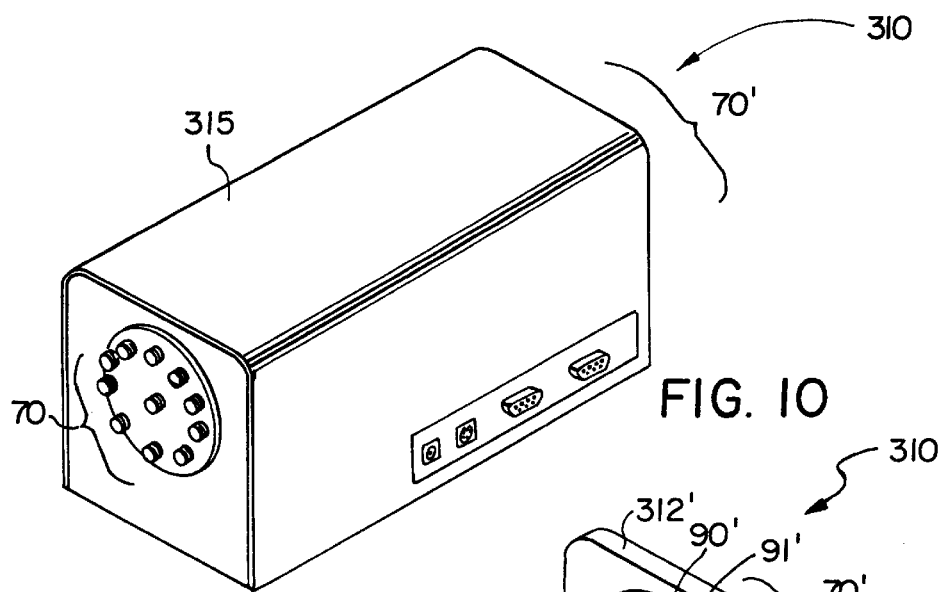
FIG. 10 is a perspective view of a preferred optical switching device 310 that switches two legs 70, 70' in a bi-pole arrangement.
Figure 11:
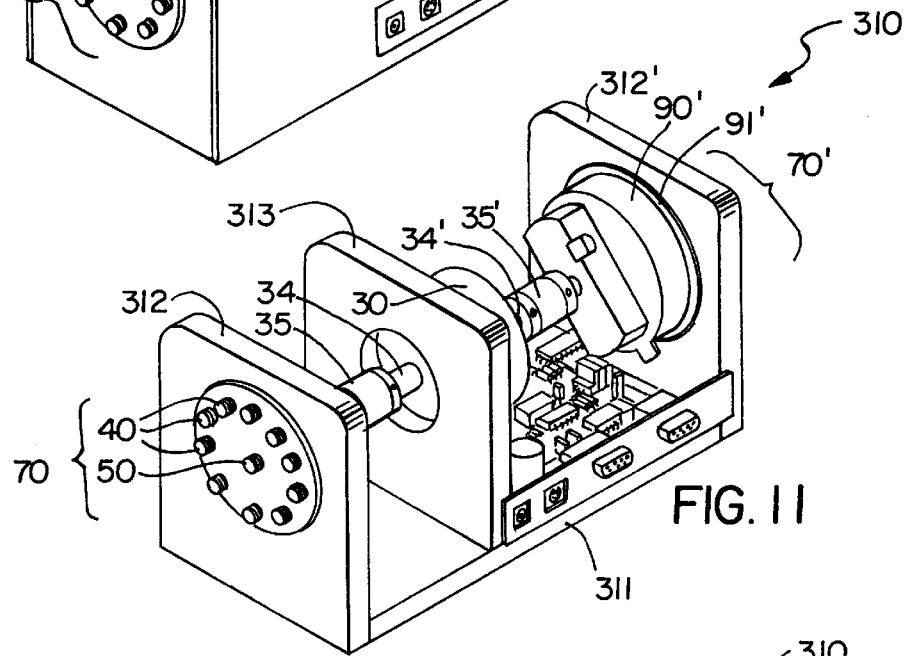
FIG. 11 is a perspective view of the preferred optical switching device 310 of FIG. 10 with the cover off.
Figure 12:
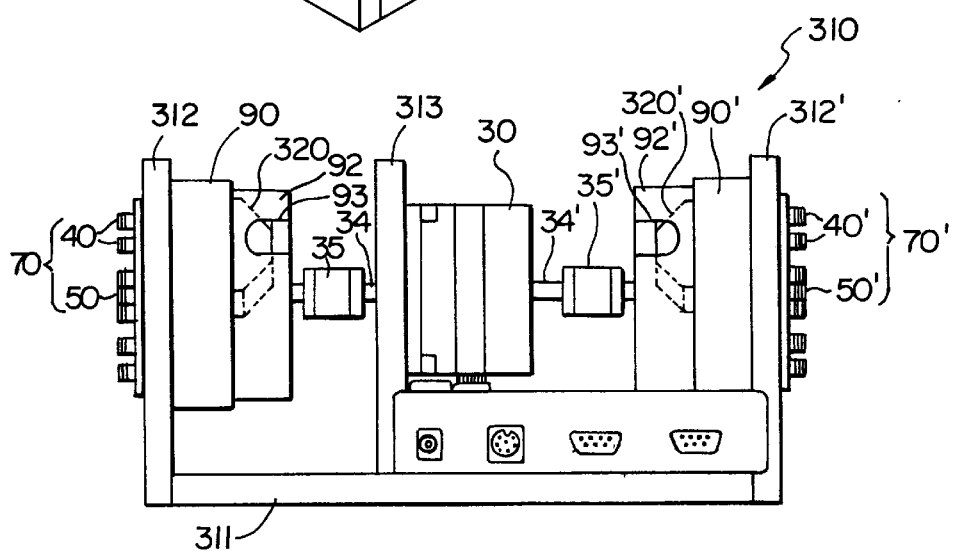
FIG. 12 is a side-plan view of the preferred optical switching device 310 of FIG. 11.

FIGS. 10, 11 and 12 illustrate a complete two-legged embodiment of the invention in which the simultaneous rotary motion of two retroreflective switching bodies 320, 320' is accomplished by means of a stepper motor 30 having two oppositely directed shafts 34, 34'.

As shown, the two retroreflective switching bodies 320, 320' are used, respectively, to switch two different legs 70, 70'. Each leg 70, 70' beneficially includes a first plurality of optical channels 40, 40' selectively coupled to a second single optical channel 50, 50' wherein the optical channels of each respective leg 70, 70' are grouped together on opposite sides of the switching device 310. The preferred switching device 310 further includes a base plate 311, first and second side walls 312, 312', a motor support wall 313, and a cover 315. The stepping motor 30 is secured to the motor support wall 313 with its first shaft 34 switching the first leg 70 and its second shaft 34' switching the second leg 70'.

Angular alignment is very critical. As explained earlier, the retroreflective switching elements 320, 320' eliminate angular deviation concerns because the outgoing beam remains in parallel with the incoming beam regardless of angular deviation.

Displacement between the beams is not as critical, but it is also important. Accordingly, in order to help keep the switching bodies 320, 320' consistently positioned between the second optical channels 50, 50' and different ones of the first optical channels 40, 40', the retroreflective switching bodies 320, 320' are preferably carried in pockets 92, 92' of cylindrical housings 90, 90' that rotate within bearings 91, 91' in the side walls 312, 312' that support the optical connectors 40, 50, 40', 50'. The preferred bearings 91 are manufactured by Kaydon Corporation under the trade name "Reali Slim." Other bearings, however, would undoubtedly suffice. The housings 90, 90', moreover, are preferably driven by the stepper motor 30 via flexible couplings 35, 35' to minimize shaft induced displacement.

The housings 90, 90' and their pockets 92, 92' are preferably machined from single blocks of aluminum. The switching bodies 320, 320' are epoxied into pockets 92, 92' in the housings 90, 90'. The switching bodies are manually positionally adjusted via adjustment slots 93, 93' before the epoxy sets to achieve the optimal displacement between the incoming and outgoing beams.

Finally, appropriate electronics and connectors are provided (not separately identified) to drive the stepper motor 30 so that the optical switching device 310 may be externally controlled using, for example, a microcomputer. The electronics needed to control the stepper motor 30 are well known and are not discussed here for brevity.

The preferred switching device 310 of FIGS. 10, 11 and 12 beneficially incorporates the three aspects of the present invention. This includes a solid switching body to reduce beam spread, a trapezoidal switching body so that the optical channel selectively connected by the switching body 320 are conveniently located on one side of the device, and a retroreflective switching body 320 so that it is unnecessary to maintain angular alignment between the switching body 320 and the optical axes of the first and second optical paths 40, 50. The preferred device 310 further includes a housing 90 and flexible coupler 35 for setting and maintaining an optimum displacement.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. An optical switching apparatus for selectively coupling radiation emanating from a desired one of a first plurality of optical channels to a second optical channel located on a same side of the apparatus, comprising:

a first plurality of optical channels for transmitting collimated radiation along a first plurality of axes that are in parallel with one another;

a second optical channel for transmitting collimated radiation along a second axis that is parallel to the first plurality of axes;

a retroreflective switching element having first, second, and third reflective faces that lie in first, second, and third planes that are oriented at 90 deg. relative to one another; and means for selectively rotating the retroreflective switching element about the second optical axis to selectively couple the desired one of the first plurality of optical channels to the second optical channel;

the first, second, and third reflective faces of the retroreflective switching element forming a retroreflector which keeps radiation entering the retroreflective switching element from one of the desired one of the first plurality of optical channels and the second optical channel in parallel alignment with radiation exiting the retroreflective switching element into the other of the desired one of the first plurality of optical channels and the second optical channel by automatically compensating for any angular deviation between the axis of rotation of the retroreflective switching element and the axes of the desired one of the first plurality of optical channels and the second optical channel.

2. The optical switching apparatus of claim 1 further comprising a wall supporting the first plurality of optical channels and the second optical channel and supporting a bearing and wherein the means for selectively rotating the retroreflective switching element comprises a cylindrical housing which rotates in the bearing.

3. The optical switching apparatus of claim 1 wherein the second and third faces remain adjacent to the second optical channel and wherein the first face is selectively rotated adjacent to the first optical channel.

4. The optical switching apparatus of claim 1 wherein the switching element comprises a solid refractive switching body which contains the first, second, and third reflective faces.

5. The optical switching apparatus of claim 4 wherein the solid refractive switching body has an index of refraction that is greater than one.

6. The optical switching apparatus of claim 4 wherein the solid refractive switching body comprises zinc sulfide (ZnS).

7. The optical switching apparatus of claim 4 wherein the solid refractive switching body is a solid refractive cube corner.

8. The optical switching apparatus of claim 7 wherein the solid refractive switching body is a section of a solid refractive cube corner.

9. The optical switching apparatus of claim 8 wherein the solid refractive cube corner section has a planar refractive surface which faces the desired one of the first plurality of optical channels and the second optical channel and wherein the first reflective face is oriented at 45 deg. relative to the planar refractive surface to internally reflect radiation within the solid refractive cube corner section in parallel with the planar refractive surface and thereby minimize the depth of the solid refractive cube corner section.

10. The optical switching apparatus of claim 1 wherein the retroreflective switching element is a solid refractive switching body and wherein radiation enters the solid refractive switching body from the desired one of the first plurality of optical channels.

11. The optical switching apparatus of claim 1 wherein the retroreflective switching element is a solid refractive switching body and wherein radiation enters the solid refractive switching body from the second optical channel.

12. The optical switching apparatus of claim 1 wherein the first face remains adjacent to the second optical channel and wherein the second and third faces are selectively rotated adjacent to the first optical channel.

* * * * *